Nov. 10, 1970   F. J. TISCHER   3,539,951
HIGH FREQUENCY DEVICE COMPENSATION
Filed March 16, 1967                                2 Sheets-Sheet 1

INVENTOR.
FREDERICK J. TISCHER
BY
*Wolf, Greenfield & Hicken*
ATTORNEYS

United States Patent Office 3,539,951
Patented Nov. 10, 1970

3,539,951
HIGH FREQUENCY DEVICE COMPENSATION
Frederick J. Tischer, Raleigh, N.C., assignor to
Andrew Alford, Winchester, Mass.
Filed Mar. 16, 1967, Ser. No. 623,684
Int. Cl. H01p 1/00; H03h 7/34
U.S. Cl. 333—34       9 Claims

ABSTRACT OF THE DISCLOSURE

A rectangular waveguide is formed with a longitudinal slotted portion and unslotted portion of substantially the same height and width and having substantially the same impedance and propagation characteristics over a relatively wide bandwidth as a result of means for reducing the height between conducting surfaces in the vinicity of a plane perpendicular to the broad walls that passes through the longitudinal slot. This means typically comprises inward extensions of the walls defining the longitudinal slot, a ridge opposite the longitudinal slot extending inward from the opposite broad wall. The compensating means may be stepped, tapered, or combinations thereof.

BACKGROUND OF THE INVENTION

The present invention relates in general to high frequency device compensation and more particularly concerns novel apparatus and techniques for compensating a slot in the wall of a waveguide oriented along the direction of propagation so that the overall waveguide having contiguous slotted and unslotted portions may be substantially reflectionless. Stated in other words, the wave impedance and propagation in the unslotted portion of the waveguide is matched to that of the slotted portion.

Slotted waveguides are widely used for making measurements at microwave and higher frequencies. A probe penetrating through the slot normally senses an indication of the electric field strength at points along the length of the slotted waveguide to provide indications of the VSWR in the slotted waveguide as a result of devices connected to the ends of the slotted waveguide. Although such slotted waveguides are useful for many applications, prior art devices themselves introduce enough of a mismatch to seriously limit the accuracy of the measurements being made. These problems are especially serious at the extremely short wavelengths when the width of the slot becomes comparable to a dimension of the waveguide.

SUMMARY OF THE INVENTION

According to the invention, there is a waveguide having a slotted portion with a longitudinal slot formed in the waveguide wal intercoupled with an unslotted portion, both portions having substantially the same height and width. The slotted portion includes means for establishing the impedance and propagation characteristics thereof substantially the same as that of the unslotted portion. The slotted portion may be coupled to the unslotted portion by a transition portion formed with a longitudinal slot in its wall of width that changes from the width of the longitudinal slot in the slotted portion to zero width immediately adjacent to the unslotted portion. The transition portion also may include a pair of longitudinally extending conducting strips that change in height from a maximum height near the slotted portion to a minimum height near the unslotted portion for reducing the impedance in the vicinity of the tapered slot in the transition portion so that the transition portion effectively matches the wave impedance of the slotted portion to that of the unslotted portion. The transition portion may comprise means for establishing a step or discrete impedance changes along the normal direction of wave propagation, means for establishing a gradual change, or combinations thereof.

It is an important object of this invention to provide methods and means for enhancing the accuracy of slotted waveguide measurements.

It is a further object of the invention to achieve the preceding object with a slotted waveguide having a slotted portion that has its wave impedance and propagation characteristics matched to that of the unslotted portion.

It is still a further object of the invention to achieve the preceding objects over a relatively wide frequency range for the $TE_{01}$ mode in rectangular waveguide.

It is still another object of the invention to achieve the preceding objects with relatively little additional physical apparatus capable of being reproducible when making slotted waveguides in production quantities.

It is still a further object of the invention to achieve the preceding objects with fixed structure that does not require adjustment from slotted waveguide to slotted waveguide.

Numerous other features, objects and advantages of the invention will become apparent from the following specification when read in connection with the accompanying drawing in which:

DETAILED DESCRIPTION OF THE PREFERRED EMBODIMENTS

Figure 1:
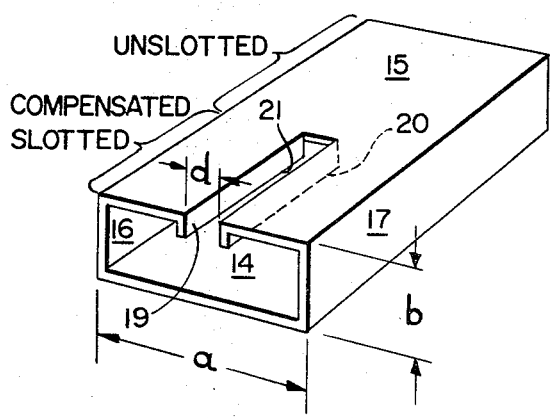
FIG. 1 is a perspective view of one embodiment of the invention in which a slotted portion of the waveguide is formed with the longitudinal walls defining the slot extending inward to effect the desired wideband impedance and propagation characteristics match.

With reference now to the drawing and more particularly FIG. 1 thereof, there is shown a perspective view of an embodiment of the invention in which an unslotted waveguide portion 11 is immediately adjacent to a slotted portion 13. Common reference symbols identify corresponding elements throughout the drawing. The waveguide includes a lower broad wall 14, an upper broad wall 15 defining a waveguide height of $b$ therebetween, a left narrow wall 16 and a right narrow wall 17, defining a waveguide width of $a$ therebetween. The slot 21 in the upper broad wall 15 in slotted portion 13 is of uniform width $d$. Slotted portion 13 includes a pair of extensions 19 and 20 of the longitudinal wall defining slot 21 depending from upper broad wall 15 immediately adjacent to slot 21 for coacting with the other structure to match the wave impedance and propagation characteristics of the unslotted portion 11 to that of the slotted portion 13.

Figure 2:
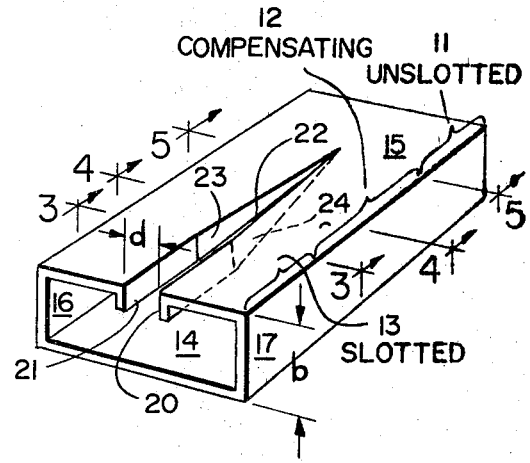
FIG. 2 is a perspective view of one embodiment of the invention in which a compensated slotted portion of the waveguide is coupled to the unslotted portion by a compensating transition portion having a tapered slot with tapered ridges depending from the slotted wall immediately adjacent to the tapered slot.

With reference to FIG. 2, there is shown a perspective view of another embodiment of the invention in which unslotted waveguide portion 11 is coupled by a compensating portion 12 to slotted portion 13. The waveguide includes lower broad wall 14, upper broad wall 15, left narrow wall 16 and right narrow wall 17. The portion 21 of the slot in the upper broad wall 15 in slotted portion 13 is of uniform width $d$. The portion 22 in compensating portion 12 tapers from width $d$ adjacent to portion 21 to zero width adjacent to unslotted portion 11. Compensating portion 12 also includes a pair of tapered ridges 23 and 24 depending from upper broad wall 15 imediately adjacent to the tapered slot portion 22 for coacting with the tapered slot portion 22 to comprise means for matching the wave impedance and propagation characteristics of the unslotted portion 11 to that of the slotted portion 13.

Figure 3:
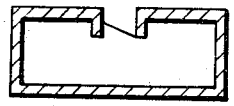
FIG. 3 is a view through section 3—3 of FIG. 2.
Figure 4:
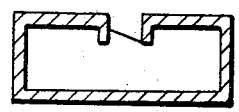
FIG. 4 is a view through section 4—4 of FIG. 2.
Figure 5:
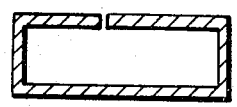
FIG. 5 is a view through section 5—5 of FIG. 2.

Referring to FIGS. 3, 4 and 5 there are shown sectional views through sections 3—3, 4—4 and 5—5 of the structure of FIG. 1 respectively, of the waveguide of FIG. 2 to illustrate how ridges 23 and 24 decrease in height from $h$ adjacent to the slotted portion 13 to substantially zero adjacent to unslotted portion 12.

Figure 6:
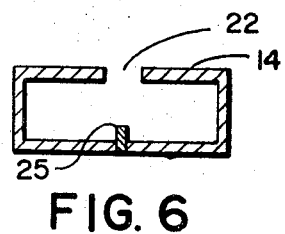
FIG. 6 is a sectional view through a compensating portion accordig to the invention in which the compensating ridge is located along the center line of the unslotted broad wall opposite the slot.

Referring to FIG. 6, there is shown a sectional view through a slotted rectangular waveguide illustrating an alternate compensating structure in which a single ridge 25 is located along the bottom wall 14 opposite the slot in upper broad wall 14. This mode of compensation has an advantage from the fabrication standpoint in that only a single relatively easy-to-fabricate ridge in the bottom wall is employed. The depending double ridge compensation structure of FIGS. 1–5 may have certain electrical advantages in that the compensating portions are very close to the slot that introduces field distortion sought to be compensated.

Figure 7:
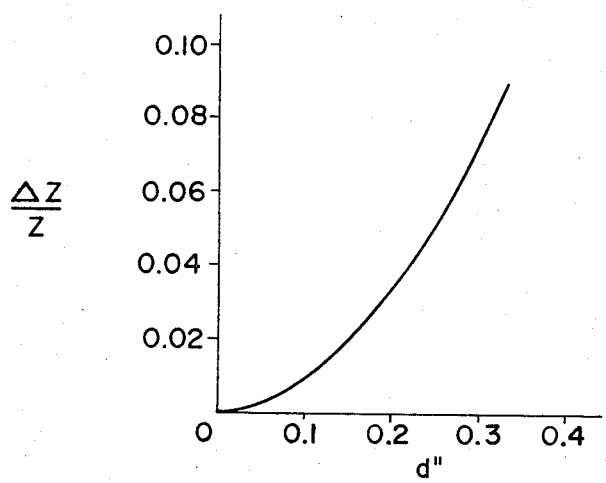
FIG. 7 is a graphical representation of the normalized change in wave impedance as a function of slot width $d$ for a typical X-band waveguide of height 0.4" and width 0.9"

Referring to FIG. 7, there is shown a graphical representataion of the normalized change in wave impedance as a function of slot width $d$ for an X-band waveguide where the width $a$ equals 0.9" and the width $b$ equals 0.4". This graphical representation indicates that when the slot width $d$ is more than 10 percent of the guide width $b$, the change in wave impedance exceeds 1 percent and changes at a still greater rate for a further incremental change in slot width $d$.

Figure 8:
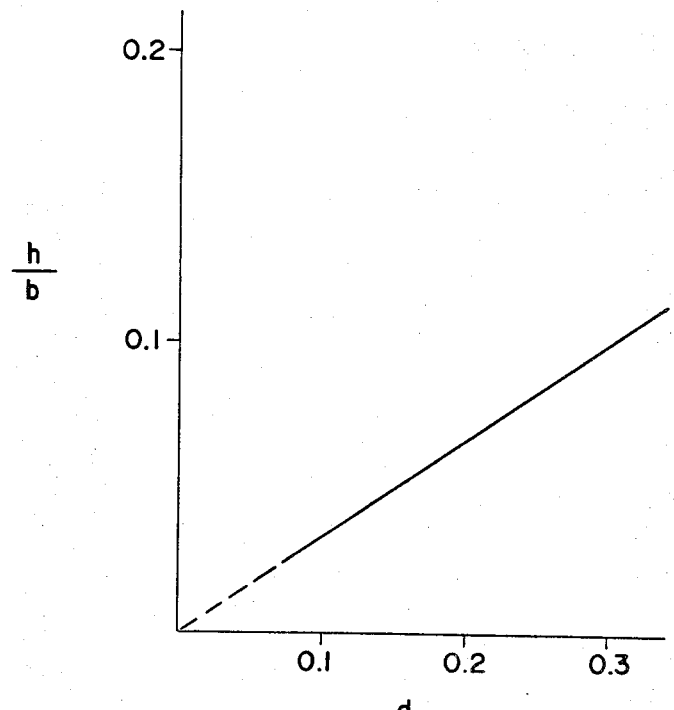
FIG. 8 is a graphical representation of the normalized change in height of the compensating ridge as a function of the normalized slot width helpful in achieving a high degree of match between slotted and unslotted portions of the waveguide.

Referring to FIG. 8, there is shown a graphical representation of the ridge penetration $h$ into the guide of slot wall extensions 19, 20, 23 and 24 and ridge 25 normalized with respect to guide height $b$ as a function of the slot width $d$ normalized with respect to twice the guide height $b$. This graph thus relates the penetration $h$ at each longitudinal section in the compensating portion 12 as a function of the slot width in that section. It may be desirable to experimentally trim the exact dimensions of the penetrations after first dimensioning in accordance with the graph of FIG. 8. The equation of that line is $h/b = (1/3)(d/2b)$.

Alternately the compensating portion could employ multiple stepped compensation in which the slot portion 22 changed width in multiple steps and the penetration $h$ changed in multiple steps so that the penetration and slot width still substantially satisfy the relationship expressed in FIG. 8 appropriately trimmed experimentally.

In a slotted section of a waveguide, the guide wavelength $\lambda_g$ in the slotted section differs from that of the non-slotted guide $\lambda_g$ by a relative amount $$\frac{\Delta \lambda_g}{\lambda_g} = \frac{1}{8\pi}\left(\frac{d}{a}\right)^2 \frac{\lambda_g^2}{db} \qquad (1)$$

where $d$ is the width of the slot and $a$, $b$ are the width and height of the rectangular guide respectively. The slotted wall of the guide is assumed to be very thick. The effect of the slot can also be expressed by a hypothetical equivalent change of the relative guide width $\Delta a/a$ given by (1)

$$\frac{\Delta a}{a} = \frac{1}{2\pi}\left(\frac{d}{a}\right)^2 \frac{g}{b} \qquad (2)$$

The characteristic impedance of the guide is hence increased by a relative amount slightly higher than that of the relative wavelength as indicated in (1).

For the compensation of the effects of the slot, there exist two simple ways; namely, either by reducing slightly the height or increasing slightly the width of the guide in accordance with the above equations. The equations indicate, however, that these compensations are frequency dependent due to the frequency dependence of $\lambda_g$. Hence, other methods of compensation have to be considered.

Figure 9:
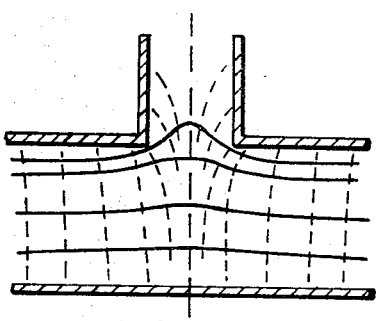
FIGS. 9 and 10 show fields in slotted waveguides that are uncompensated and compensated, respectively.
Figure 10:
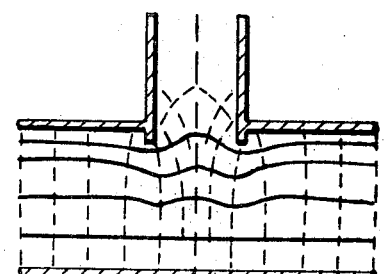

A practically frequency independent slot compensation can be achieved by extending the walls of the slot into the interior region of the waveguide as indicated above. The two extended walls deform the field configuration inside the waveguide in such a manner that the impedance and propagation characteristics of the compensated waveguide approach those of the non-slotted guide. FIGS. 9 and 10 show the approximate field configurations for the noncompensated and compensated slotted guides, respectively, for comparison. The field configurations indicate that the electric flux of the slotted guide is reduced in the slotted region which leads to a reduced capacitance per unit length of the guide. This decrease is compensated in the structure of FIG. 10 by the increase of the capacitance caused by the two ridges on both sides of the slot. The same rules applied to the magnetic field indicate an increase of the inductance per unit length in the slot region which also is reduced in the field structure of FIG. 10 by the two ridges. Conformal mapping of these field configurations into those between parallel conducting walls confirms these findings.

The physics concept of the compensation can also be considered qualitatively by evaluating the field configurations in FIGS. 9 and 10. The sizes of the equivalent squares between the field lines of FIG. 9 give a clear indication of the reduced width $a - \Delta a$ (increased size of the squares). In the case of the compensation in FIG. 10, the squares, particularly those in the lower row, have approximately the original size typical for the non-slotted configuration. This indicates that the width $a$ of the compensated slotted guide is identical to that of the non-slotted guide.

The preceding considerations indicate that the height of the ridges formed by the extended slot walls, $h$ should be such that the width of the contour enclosing the field configuration indicated in the $z$-plane should be identical to that of the transformed configuration in the $w$-plane (in the $jv$ direction). This condition will henceforth serve as a criterion for the compensation.

The mathematical formulation of the criteria for the compensated structure is indicated in the following equations:

$$w = j\frac{a}{2} = j\frac{b}{\pi}\cosh^{-1}(2t_a + 1) \qquad (3)$$

and $$z = j\frac{a}{2} = j\frac{b}{\pi}\left[\cosh^{-1}(-\xi_a) + \frac{r_1}{\sqrt{r_2}}\cos^{-1}\eta_a\right] \qquad (4)$$

$$\xi_a = \frac{1-r^2}{1+r_2} + \frac{2t_a}{1+r_2}; \quad \eta_a = \frac{1-r_2}{1+r_2} - \frac{2r_2}{t_a(1+r_2)}$$

The equations are evaluated by the following procedure. For a given ratio $a/b$ of the rectangular guide, Eq. 3 yields a specific value of $t_a$. This value is substituted into Eq. 4 which in turn yields a relationship between $r_1$ and $r_2$. It can be shown that $r_1/\sqrt{r_2} = d/(2b)$, thereby permitting determination of $r_1$ and $r_2$. Since Eq. 4 is transcendental, it is convenient to evaluate the equations in diagram form for a succession of values of $r_2$ determining $\xi$ and $\eta$ and from those $$\frac{r_1}{\sqrt{r_2}} = \frac{\cosh^{-1}(2t_a+1) - \cosh^{-1}(-\xi_a)}{\cos^{-1}\eta_a} \quad (5)$$

For each value of $r_2$ the value of $r_1$ and $d/2b$ can then be found. This means that $r_1$ and $r_2$ are known as a function of $d/2b$ which is one half of the relative width of the slot for a given ration $a/b$.

The next step is the determination of the relative height of the compensation ridges $h/b$. Evaluation of the transformation gradient in this region yields $$z = \frac{b}{\pi}\left[-\cos^{-1}\xi + \frac{r_1}{\sqrt{r_2}}\cosh^{-1}(-\eta)\right] + b + j\frac{d}{2} \quad (6)$$

Use of this equation for which the values of $t$ in the $t$-plane are $r_1$ and $r_2$, gives $$h = z_D - z_C = -\frac{b}{\pi}\left[-\cos^{-1}\xi_c + \frac{r_1}{\sqrt{r_2}}\cosh^{-1}(-\eta_c)\right] \quad (7)$$

where $$\xi_c = \frac{1-r_2}{1+r_2} + \frac{2r_1}{1+r_2}; \quad \eta_c = \frac{1-r_2}{1+r_2} - \frac{2r_2}{r_1(1+r_2)}$$

Evaluation of Eq. 7 for the originally assumed value of $r_2$ and the found value of $r_1$ gives finally $h/b$ for each value of $r_2$ and the corresponding value of $d/2b$. The results permit plotting $h/b$ as a function of $d/2b$ in diagram form.

NUMERICAL EXAMPLES

Numerical examples computed by using the above equations are shown in Table I and FIG. 8. The computed data are valid for the X-band waveguide RG 52/U, with outer dimensions 1 x 1½ inches and with inner dimensions .9 x .4 inch. The ratio $a/b$ is 2/25 and the corresponding value of $t$ in the $t$-plane is $t_a = -9.125$. The table shows the values of the quantities essential for computing the data for this cross-sectional ratio. FIG. 8 shows in diagram form the relationship between the relative height of the ridges $h/b$ and one half of the relative slot width $d/2b$ for full compensation.

Additional computer-derived data for the slot compensation of millimeter waveguides is set forth in Appendix A. Values do not change very much for changes of the aspect ratio.

TABLE I
[$2t_a = -18.25$]

| $b$ | $\xi$ | $\eta$ | $r_1$ | $r_1\sqrt{r_2}$ | $h/b$ |
|---|---|---|---|---|---|
| 0.02 | −16.93 | 0.9651 | 0.0099 | 0.0705 | 0.0239 |
| 0.05 | −16.47 | 0.9152 | 0.0248 | 0.1108 | 0.0376 |
| 0.10 | −15.77 | 0.8381 | 0.0492 | 0.1555 | 0.0529 |
| 0.15 | −15.13 | 0.7677 | 0.0732 | 0.1889 | 0.0643 |
| 0.20 | −14.54 | 0.7032 | 0.0968 | 0.2164 | 0.0737 |
| 0.30 | −13.49 | 0.5891 | 0.1430 | 0.2611 | 0.0892 |

The resultant slotted waveguide made according to the invention itself negligibly introduces error in slotted waveguide measurements so that slotted waveguide measurements may be made with exceptional precision. Yet the compensating portion is relatively easy and inexpensive to fabricate and is reproducible in production without requiring additional adjustment from unit-to-unit. The principles of the invention are also applicable to a slotted portion contiguous with an unslotted portion dimensioned to have substantially the same wave impedance and propagation characteristics.

There has been described a slotted waveguide with a compensating transition portion for intercoupling an unslotted portion with the slotted portion and for matching the wave impedance of the unslotted portiton to that of the slotted portion with high precision. It is evident that those skilled in the art may now make numerous modifications and uses of and departures from the specific embodiments described herein without departing from the inventive concepts. Consequently, the invention is to be construed embracing each and every novel feature and novel combination of features present in or possessed by the apparatus and techniques herein disclosed and as limited solely by the spirit and scope of the appended claims.

APPENDIX A.—TWO-RIDGE COMPENSATION OF THE SLOT IN A RECTANGULAR GUIDE

[Numerical values]

| Frequency, gHz. | Band notation | Guide RG- | Dimensions | Aspect ratio | $2t_a$ | Table |
|---|---|---|---|---|---|---|
| 8–12 | X | 52/U | 0.9×0.4 | 2.25 | −18.25 | I |
| 12–18 | $K_u$ | 91/U | 0.622×0.311 | 2 | −12.59 | II |
| 18–26 | K | 53/U | 0.42×0.17 | 2.47 | −25.22 | III |
| 26–40 | A | 96/U | 0.28×0.14 | 2 | −12.59 | II |
| 33–50 | B | 97/U | 0.224×0.112 | 2 | −12.59 | II |
| 50–75 | V | 98/U | 0.148×0.074 | 2 | −12.59 | II |

TABLE I
[$2t_a = -18.25$; $a/b = 2.25$]

| $r_2$ | $\xi$ | $\eta$ | $r_1$ | $r_1/\sqrt{r_2}$ |
|---|---|---|---|---|
| 0.02 | −16.93 | 0.9651 | 0.0099 | 0.0705 | 0.0239 |
| 0.05 | −16.47 | 0.9152 | 0.0248 | 0.1108 | 0.0376 |
| 0.10 | −15.77 | 0.8381 | 0.0492 | 0.1555 | 0.0529 |
| 0.15 | −15.13 | 0.7677 | 0.0732 | 0.1889 | 0.0643 |
| 0.20 | −14.54 | 0.7032 | 0.0968 | 0.2164 | 0.0737 |
| 0.30 | −13.49 | 0.5891 | 0.0968 | 0.2611 | 0.0892 |
| 0.40 | −12.61 | 0.4912 | 0.1430 | 0.2972 | 0.1017 |

TABLE II
[$2t_a = -12.59$; $a/b = 2$]

| $r_2$ | $\xi$ | $\eta$ | $r_1$ | $r_1/\sqrt{r_2}$ | $h/b$ |
|---|---|---|---|---|---|
| 0.02 | −11.38 | 0.9670 | 0.0099 | 0.0704 | 0.02392 |
| 0.05 | −11.09 | 0.9199 | 0.0247 | 0.1108 | 0.03766 |
| 0.10 | −10.63 | 0.8471 | 0.0491 | 0.1554 | 0.05289 |
| 0.15 | −10.21 | 0.7806 | 0.0731 | 0.1887 | 0.06435 |
| 0.20 | −9.83 | 0.7196 | 0.0967 | 0.2162 | 0.07384 |
| 0.30 | −9.15 | 0.6118 | 0.1428 | 0.2608 | 0.08934 |
| 0.40 | −8.56 | 0.5194 | 0.1877 | 0.2968 | 0.01020 |

TABLE III
[$2t_a = -25.22$; $a/b = 2.47$]

| $r_2$ | $\xi$ | $\eta$ | $r_1$ | $r_1/\sqrt{r_2}$ | $h/b$ |
|---|---|---|---|---|---|
| 0.02 | −22.78 | 0.9640 | 0.0099 | 0.0705 | 0.02391 |
| 0.05 | −22.16 | 0.9126 | 0.0248 | 0.1109 | 0.03763 |
| 0.10 | −21.20 | 0.8332 | 0.0492 | 0.1555 | 0.05284 |
| 0.15 | −20.32 | 0.7607 | 0.0732 | 0.1889 | 0.06426 |
| 0.20 | −19.52 | 0.6942 | 0.0968 | 0.2165 | 0.07370 |
| 0.30 | −18.78 | 0.5766 | 0.1431 | 0.2613 | 0.08909 |
| 0.40 | −16.87 | 0.4758 | 0.1882 | 0.2975 | 0.10161 |

What is claimed is:

1. A waveguide comprising,
    a longitudinally slotted waveguide portion contiguous with an unslotted waveguide portion,
    and means inside said longitudinally slotted waveguide for altering the field distribution in said slotted portion for establishing the wave impedance and propagation characteristics of said slotted portion substantially the same as that of said unslotted portion,
    said waveguide being rectangular with opposed broad walls separated substantially by a distance $b$ and opposed narrow walls separated by a distance $a$ and dimensioned to support propagation of the $TE_{01}$ mode, the field of which mode is altered by said means for altering,
    said means for altering comprising at least one lengthwise segment in the vicinity of said slot closely adjacent to a plane perpendicular to said broad walls and passing through the longitudinal slot, said at least one lengthwise segment comprising means for increasing the effective capacity between said broad walls in the region of said waveguide embracing said plane.

2. A waveguide in accordance with claim 1 wherein said waveguide is rectangular with opposed broad walls separated substantially by a distance $b$ and opposed narrow walls separated by a distance $a$ and dimensioned to support propagation of the $TE_{01}$ mode, the field of which mode is altered by said means for altering.

3. A waveguide in accordance with claim 1 wherein said at least one lengthwise segment penetrated into said waveguide to a depth $h$ related to the slot width $d$ nearest said segment depth $h$ related to said distance $b$ substantially in accordance with the relationship $$h/b = (1/3)(d/2b)$$

4. A waveguide in accordance with claim 3 wherein said means for altering comprises extensions of the wall defining said slot.

5. A waveguide in accordance with claim 3 wherein said means for altering comprises a ridge opposite said slot penetrating from the broad wall opposite the broad wall containing said slot.

6. A waveguide in accordance with claim 4 wherein said slot is of uniform width.

7. A waveguide in accordance with claim 5 wherein said slot is of uniform width.

8. A waveguide in accordance with claim 4 wherein said slot and said extensions include at least associated segments that taper while maintaining said relationship.

9. A waveguide in accordance with claim 8 wherein said slot and said ridge include at least associated segments that taper while maintaining said relationship.

References Cited

UNITED STATES PATENTS

| | | | |
|---|---|---|---|
| 2,496,837 | 2/1950 | Woodyard | 324—95 XR |
| 2,534,437 | 12/1950 | Ginzton | 333—95 XR |
| 2,996,692 | 8/1961 | Christensen et al. | 333—98 |
| 3,110,002 | 11/1963 | Bleackley | 333—98 |
| 2,596,480 | 5/1952 | Guptill et al. | 343—771 |
| 2,818,565 | 12/1957 | Ajioka et al. | 343—767 |
| 2,908,905 | 10/1959 | Saltzman | 343—771 |

OTHER REFERENCES

"A Survey of the Principles & Practice of Wave Guides," Huxley, The Macmillan Co., New York, 1947, TK 6565 W3 H9, pp. 29–31 and 74–75 relied upon.

HERMAN KARL SAALBACH, Primary Examiner

M. NUSSBAUM, Assistant Examiner

U.S. Cl. X.R.

324—95; 333—98